(12) United States Patent
Drossman

(10) Patent No.: US 10,549,807 B2
(45) Date of Patent: Feb. 4, 2020

(54) SELF-BALANCING PERSONAL VEHICLE WITH SUSPENDED HARNESS ASSEMBLY

(71) Applicant: Andrew Michael Drossman, Old Bethpage, NY (US)

(72) Inventor: Andrew Michael Drossman, Old Bethpage, NY (US)

( * ) Notice: Subject to any disclaimer, the term of this patent is extended or adjusted under 35 U.S.C. 154(b) by 0 days.

(21) Appl. No.: 16/083,400

(22) PCT Filed: Jun. 8, 2018

(86) PCT No.: PCT/US2018/036749
§ 371 (c)(1),
(2) Date: Sep. 7, 2018

(87) PCT Pub. No.: WO2018/231653
PCT Pub. Date: Dec. 20, 2018

(65) Prior Publication Data
US 2019/0367119 A1     Dec. 5, 2019

Related U.S. Application Data

(60) Provisional application No. 62/519,622, filed on Jun. 14, 2017.

(51) Int. Cl.
*B62K 11/00* (2006.01)
*B62K 1/00* (2006.01)
(Continued)

(52) U.S. Cl.
CPC .......... *B62K 11/007* (2016.11); *B60K 7/0007* (2013.01); *B62D 35/005* (2013.01);
(Continued)

(58) Field of Classification Search
CPC ........ B62K 11/007; B62K 1/00; B62K 11/14; B62K 2204/00; B60K 7/007;
(Continued)

(56) References Cited

U.S. PATENT DOCUMENTS

| | | | | |
|---|---|---|---|---|
| 4,372,506 A | * | 2/1983 | Cronk | B64C 25/04 244/100 R |
| 4,463,817 A | * | 8/1984 | Mennesson | A61H 3/04 180/65.51 |

(Continued)

OTHER PUBLICATIONS

International Search Report and Written Opinion, PCT/US2018/036749, dated Aug. 24, 2018.

*Primary Examiner* — Joseph M Rocca
*Assistant Examiner* — Marlon A Arce
(74) *Attorney, Agent, or Firm* — Entralta P.C.; Justin G. Sanders; Peter D. Weinstein

(57) ABSTRACT

A self-balancing personal vehicle is disclosed. In at least one embodiment, the vehicle provides a chassis having an at least one primary wheel positioned and configured for being in rolling contact with the ground. At least one drive motor is positioned and configured for selectively driving the at least one primary wheel. At least one self-balancing system is configured for automatically assisting the vehicle in maintaining a substantially upright position during use. At least one harness assembly is engaged with a suspension frame secured to the chassis, the harness assembly being sized and configured for removably receiving and suspending an at least one user a distance above the chassis. At least one control bar is positioned and configured for allowing the user to grasp said control bar while suspended within the harness assembly, for selectively repositioning their body and shifting their weight, relative to the at least one primary wheel.

20 Claims, 7 Drawing Sheets

(51) Int. Cl.
  *B62K 11/14*   (2006.01)
  *B60K 7/00*    (2006.01)
  *B62D 35/00*   (2006.01)
  *B62D 37/02*   (2006.01)
  *B62J 23/00*   (2006.01)
  *B62J 17/02*   (2006.01)
  *A61H 3/00*    (2006.01)
  *A63B 21/00*   (2006.01)
  *A47D 13/04*   (2006.01)

(52) U.S. Cl.
  CPC .............. *B62D 37/02* (2013.01); *B62J 17/02* (2013.01); *B62J 23/00* (2013.01); *B62K 1/00* (2013.01); *B62K 11/14* (2013.01); *A47D 13/04* (2013.01); *A61H 3/00* (2013.01); *A61H 3/008* (2013.01); *A63B 21/00181* (2013.01); *B62K 2204/00* (2013.01)

(58) Field of Classification Search
  CPC ........ B62D 35/005; B62D 37/02; B62J 17/02; B62J 23/00; A47D 13/04; A61H 3/00; A61H 3/008; A63B 21/00181
  See application file for complete search history.

(56) References Cited

U.S. PATENT DOCUMENTS

| | | | |
|---|---|---|---|
| 5,252,068 A | 10/1993 | Gryder | |
| 5,314,034 A | 5/1994 | Chittal | |
| 5,322,409 A * | 6/1994 | McCluney | A01D 46/243 280/32.5 |
| 5,526,893 A * | 6/1996 | Higer | A61H 3/04 180/65.1 |
| 6,561,294 B1 | 5/2003 | Kamen et al. | |
| 7,004,271 B1 | 2/2006 | Kamen et al. | |
| 7,963,352 B2 | 6/2011 | Alexander | |
| 8,011,459 B2 * | 9/2011 | Serai | B62K 11/007 180/218 |
| 8,474,851 B2 * | 7/2013 | Schwartz | B62J 1/28 280/290 |
| 8,584,782 B2 | 11/2013 | Chen | |
| 8,684,123 B2 | 4/2014 | Chen | |
| 8,714,593 B2 * | 5/2014 | Bonanno | B62K 5/08 280/771 |
| 8,725,355 B2 | 5/2014 | Quick | |
| 8,800,697 B2 | 8/2014 | Hoffmann et al. | |
| 8,807,250 B2 | 8/2014 | Chen | |
| 9,010,474 B2 | 4/2015 | Martinelli et al. | |
| 9,079,633 B2 | 7/2015 | Yeh et al. | |
| 9,085,334 B2 | 7/2015 | Hoffmann et al. | |
| 9,101,817 B2 | 8/2015 | Doerksen | |
| 9,168,966 B2 * | 10/2015 | Field | B60N 2/045 |
| 9,400,505 B2 | 7/2016 | Doerksen | |
| 9,452,802 B2 | 9/2016 | Ying et al. | |
| 9,597,580 B2 | 3/2017 | Doerksen | |
| 9,604,692 B1 | 3/2017 | Kim | |
| 9,611,004 B2 | 4/2017 | Hoffmann et al. | |
| 2002/0121394 A1 * | 9/2002 | Kamen | A61G 5/061 180/41 |
| 2004/0063550 A1 * | 4/2004 | Harris | A61H 3/008 482/69 |
| 2006/0157957 A1 | 7/2006 | Bever | |
| 2009/0256331 A1 * | 10/2009 | Horiguchi | B60G 21/007 280/304.1 |
| 2009/0266629 A1 | 10/2009 | Simeray et al. | |
| 2009/0298653 A1 * | 12/2009 | Rodetsky | A61H 3/04 482/69 |
| 2010/0017069 A1 | 1/2010 | Miki et al. | |
| 2010/0133767 A1 * | 6/2010 | Arney | B62B 13/043 280/28.15 |
| 2011/0175319 A1 | 7/2011 | Chen | |
| 2014/0058600 A1 | 2/2014 | Hoffman et al. | |
| 2015/0259020 A1 | 9/2015 | Hoffman et al. | |
| 2016/0304159 A1 | 10/2016 | Huang et al. | |

* cited by examiner

SELF-BALANCING PERSONAL VEHICLE WITH SUSPENDED HARNESS ASSEMBLY

RELATED APPLICATIONS

This application is a 35 U.S.C. 371 US national stage entry and is entitled to the earliest effective filing date of international application number PCT/US2018/036749, filed on Jun. 8, 2018, which itself claims priority to U.S. provisional application Ser. No. 62/519,622, filed on Jun. 14, 2017. The contents of the aforementioned applications are incorporated herein by reference.

BACKGROUND

The subject of this patent application relates generally to self-balancing vehicles, and more particularly to a self-balancing personal vehicle with a suspended harness assembly configured for allowing a user to be suspended therewithin and operate the vehicle through selectively shifting the user's weight.

Applicant hereby incorporates herein by reference any and all patents and published patent applications cited or referred to in this application.

By way of background, self-balancing personal vehicles typically provide one or more wheels, at least one drive motor, and a stable platform on which a user may stand or sit. These vehicles also typically utilize gyroscopic sensors and accelerometer-based leveling sensors to detect changes in pitch angle such that, in order to maintain balance, the vehicles automatically drive their wheels forward or backward as needed to return their pitch to upright. Accordingly, the user is able to command such a self-balancing vehicle to travel forward and/or backward by shifting their weight forward and/or backward on the vehicle's platform. Based on this functionality, known self-balancing personal vehicles require that the user either stand or sit on the provided stable platform in order to properly control the vehicle. Thus, these known prior art vehicles are unable to provide the user with a feeling of flying above the ground (such as the feeling experienced during hang gliding, for example), given that the user rolls directly across the ground while in a seat or on a platform that is rigidly attached to such prior art vehicles.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a self-balancing personal vehicle. In at least one embodiment, the vehicle provides a chassis having an at least one primary wheel positioned and configured for being in rolling contact with the ground or a similar surface. An at least one drive motor is positioned and configured for selectively driving the at least one primary wheel. An at least one self-balancing system is configured for automatically assisting the vehicle in maintaining a substantially upright position during use. A suspension frame is secured to the chassis. An at least one harness assembly is engaged with the suspension frame, the harness assembly being sized and configured for removably receiving and suspending an at least one user a distance above the chassis. An at least one control bar is positioned and configured for allowing the user to grasp said control bar with at least one hand while suspended within the harness assembly. Accordingly, while the user is suspended within the at least one harness assembly during use of the vehicle, the user is able to control the vehicle by selectively repositioning their body and shifting their weight, relative to the at least one primary wheel, via the at least one control bar Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
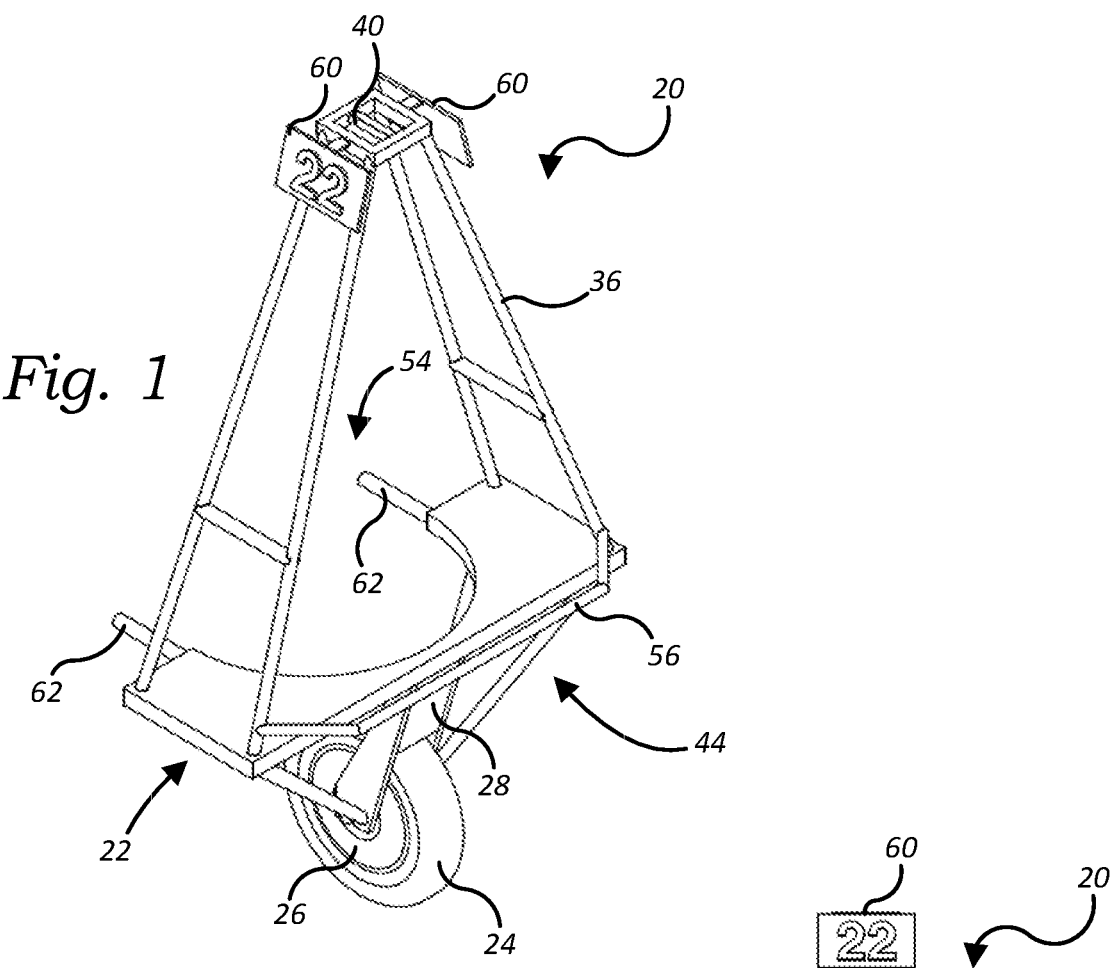
FIG. 1 is a perspective view of an exemplary self-balancing personal vehicle, in accordance with at least one embodiment.
Figure 2:
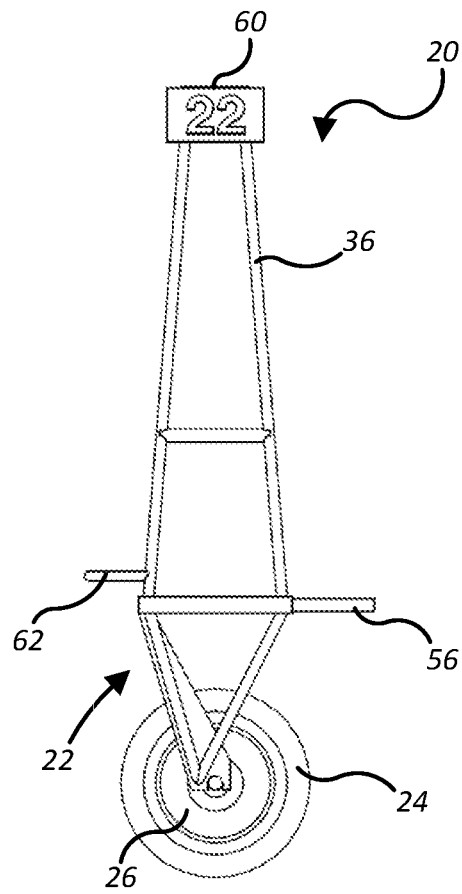
FIG. 2 is a side elevational view thereof, in accordance with at least one embodiment.

Turning now to FIGS. 1 and 2, there is shown an exemplary embodiment of a self-balancing personal vehicle 20. In at least one embodiment, the vehicle 20 provides a chassis 22 having an at least one primary wheel 24 positioned and configured for being in rolling contact with the ground or a similar surface. It should be noted that the particular size, shape, configuration and quantity of the at least one primary wheel 24 depicted in the drawings is merely exemplary and is being shown for illustrative purposes only. As such, in further embodiments, the at least one primary wheel 24 may take on any other size, shape, configuration or quantity, now known or later developed, so long as the vehicle 20 is capable of substantially carrying out the functionality described herein. In that regard, it should also be noted that while the vehicle 20 shown in the accompanying drawings only provides a single primary wheel 24, in further embodiments, the vehicle 20 may provide two or more primary wheels 24—arranged longitudinally, laterally, or both—so long as the vehicle 20 is capable of substantially carrying out the functionality described herein. It should also be noted that, in at least one embodiment, the term "wheel" is intended to generally include any structure, mechanism, or combination thereof (now known or later developed) capable of allowing the vehicle 20 to traverse over the ground or a similar surface (such as soil, snow, ice, etc.). For example, in at least one embodiment, the at least one primary wheel 24 may comprise one or more continuous tracks, or one or more elongate cylindrical rollers. In at least one further embodiment, the at least one primary wheel 24 is configured for allowing the vehicle 24 to traverse over water or other liquids. Relatedly, in at least one embodiment, the term "ground" is intended to generally include any surface over which the vehicle 20 is capable of traversing. In at least one embodiment, the at least one primary wheel 24 is a self-propelled, self-balancing wheel, as described further below. It should also be noted that the particular size, shape and configuration of the chassis 22 depicted in the drawings is merely exemplary and is being shown for illustrative purposes only. As such, the chassis 22 should not be read as being so limited, but instead may take on any other size, shape or configuration, now known or later developed, in further embodiments, so long as the vehicle 20 is capable of substantially carrying out the functionality described herein.

Figure 7:
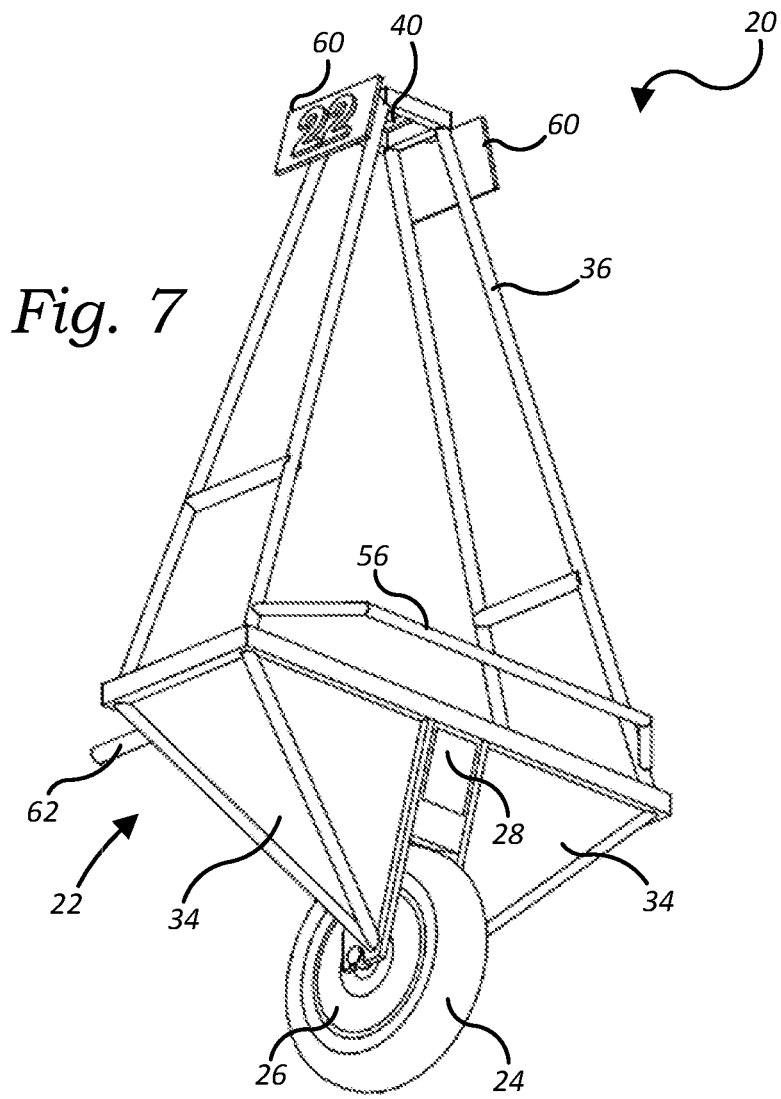
FIG. 7 is a perspective view of a still further exemplary self-balancing personal vehicle, in accordance with at least one embodiment.

In at least one embodiment, the vehicle 20 also provides an at least one electric drive motor 26 positioned and configured for selectively driving the at least one primary wheel 24. In at least one such embodiment, the at least one drive motor 26 is a hub motor positioned within the at least one primary wheel 24. In still further embodiments, the at least one drive motor 26 may be any other type of drive motor (and may be positioned anywhere else on the vehicle 20), now known or later developed, so long as the vehicle 20 is capable of substantially carrying out the functionality described herein. In at least one embodiment, the vehicle 20 also provides an at least one self-balancing system 28 configured for automatically assisting the vehicle 20 in maintaining a substantially upright position during use. In at least one such embodiment, the self-balancing system 28 includes at least one of a gyroscopic sensor and an accelerometer-based leveling sensor (along with the necessary software/electronic components) positioned and configured for detecting changes in a pitch angle of the vehicle 20 and, in turn, causing the at least one primary wheel 24 to automatically rotate forward or backward as needed in order to return the vehicle 20 to a substantially upright pitch. In further embodiments, the self-balancing system 28 may incorporate any other technologies (or combinations of technologies), now known or later developed, that are capable of automatically assisting the vehicle 20 in maintaining a substantially upright position during use. In at least one embodiment, the vehicle 20 is only self-balancing in the direction of travel (i.e., longitudinally), with lateral stability being provided by a user 30. However, in at least one further embodiment, the vehicle 20 is self-balancing both longitudinally as well as laterally. In at least one embodiment, the vehicle 20 also provides an at least one battery 32 in electrical communication with the at least one drive motor 26 and self-balancing system 28. In at least one embodiment, as illustrated best in FIG. 7, the chassis 22 provides body panels 34 sized and configured for enclosing and protecting the various components of the self-balancing system 28, along with any other internal components the vehicle 20 might incorporate in various embodiments.

Figure 6A:
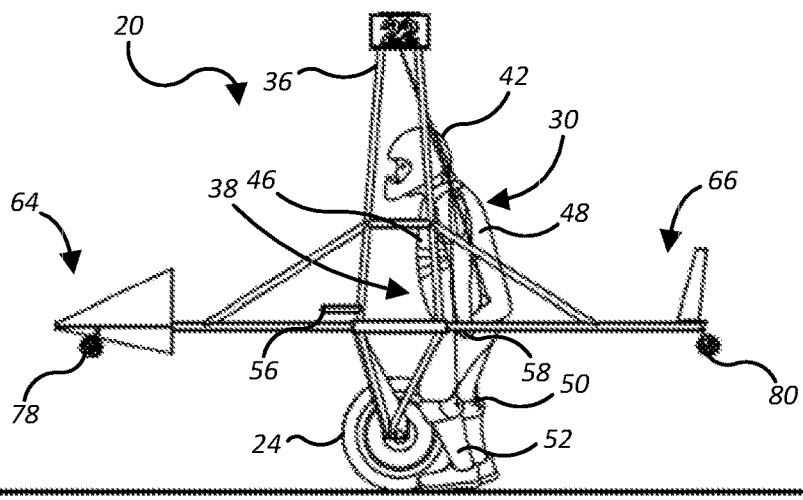
FIGS. 6A, 6B and 6C illustrate the use of an exemplary self-balancing personal vehicle, in accordance with at least one embodiment.
Figure 6B:
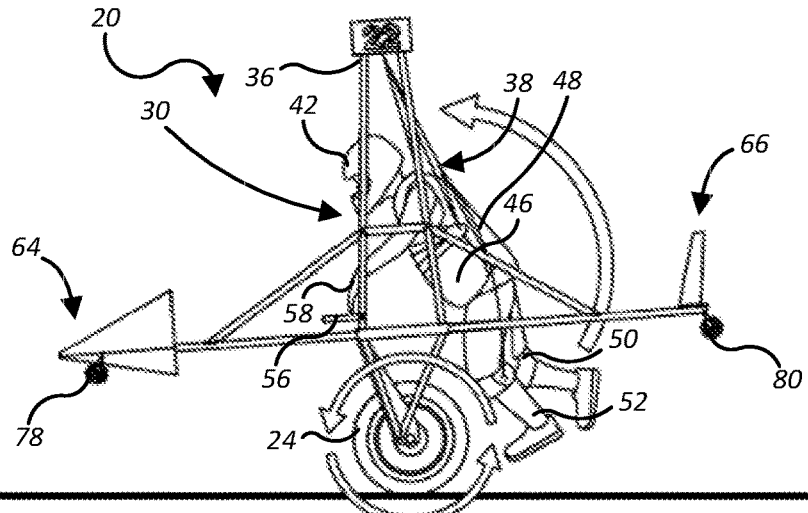
Figure 6C:
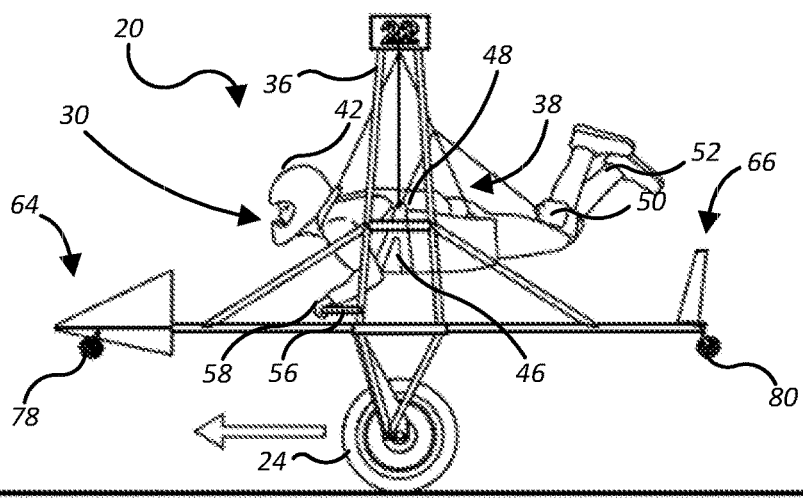

With continued reference to FIGS. 1 and 2, and as further illustrated in FIGS. 6A-6C, in at least one embodiment, the vehicle 20 also provides a suspension frame 36 secured to the chassis 22 and configured for supporting an at least one harness assembly 38 therefrom, a distance above the chassis 22. The harness assembly 38, in turn, is sized and configured for removably receiving and supporting an at least one user 30 of the vehicle 20, with the user 30 being suspended a distance above the chassis 22. In at least one embodiment, the suspension frame 36 is configured for allowing the harness assembly 38 to position a center of mass of the user 30 substantially over the at least one primary wheel 24. It should be noted that the particular size, shape and configuration of suspension frame 36 depicted in the drawings is merely exemplary and is being shown for illustrative purposes only. As such, the suspension frame 36 should not be read as being so limited, but instead may take on any other size, shape or configuration, now known or later developed, in further embodiments, so long as the vehicle 20 is capable of substantially carrying out the functionality described herein. In at least one embodiment, the suspension frame 36 provides an at least one attachment point 40 configured for engagement (either removable or permanent) with the at least one harness assembly 38. In at least one such embodiment, the at least one attachment point 40 is an elongate beam, tube or similar structure. In at least one further embodiment, the attachment point 40 is a ball joint configured for allowing the at least one harness assembly 38 freedom of movement in virtually any direction about the attachment point 40. In still further embodiments, the at least one attachment point 40 may incorporate any other structure or mechanism (or combinations thereof), now known or later developed, so long as the vehicle 20 is capable of substantially carrying out the functionality described herein.

In at least one embodiment, as best illustrated in FIGS. 6A-6C, the at least one harness assembly 38 is configured for removably receiving and supporting the at least one user 30 in a substantially prone position, with a head 42 of the user 30 positioned proximal a front end 44 of the vehicle 20 (i.e., in a substantially head-first orientation). In at least one such embodiment, the at least one harness assembly 38 provides an apron harness 46 sized and configured for receiving and supporting a torso 48 of the user 30. In at least one embodiment, the at least one harness assembly 38 further provides a pair of leg supports 50 (commonly referred to as "knee hangers") configured for receiving and supporting the legs 52 of the user 30. In further embodiments, other types of harnesses—such as pod harnesses, cocoon harnesses, or other suspension harnesses commonly used in the field of hang gliding, for example—may be substituted. Thus, it should be noted that the particular size, shape and configuration of the harness assembly 38 depicted in the drawings is merely exemplary and is being shown for illustrative purposes only. As such, the harness assembly 38 should not be read as being so limited, but instead may take on any other size, shape or configuration, now known or later developed, in further embodiments, so long as the vehicle 20 is capable of substantially carrying out the functionality described herein. For example, in at least one such further embodiment, the harness assembly 38 is sized and configured for removably receiving and supporting the at least one user 30 in a substantially supine position, with the head 42 of the user 30 positioned proximal a rear end 54 of the vehicle 20 (i.e., in a substantially feet-first orientation). In at least one still further embodiment, the harness assembly 38 is sized and configured for removably receiving and supporting the at least one user 30 in a substantially seated or upright position. In at least one such further embodiment, the harness assembly 38 is a freely swingable seat or other type of rigid or flexible support. In at least one embodiment, the rigid or flexible seat is connected to the ball joint attachment by a rigid beam, tubular structure, or similar non-flexible material.

Referring again to FIGS. 1 and 2, in at least one embodiment, the vehicle 20 also provides an at least one control bar 56 secured to either the chassis 20 or the suspension frame 36 (or elsewhere on the vehicle 20), the at least one control bar 56 positioned and configured for allowing the user 30 to grasp the control bar 56 with at least one hand 58 while suspended within the harness assembly 38. As discussed further below, the at least one control bar 56 allows the user 30 to control the vehicle 20 by the user 30 selectively repositioning their body and shifting their weight, relative to the at least one primary wheel 24, while suspended within the harness assembly 38. In other words, if the user 30 shifts their weight forward (by pulling their body, via the at least one control bar 56, relatively closer to the front end 44 of the vehicle 20), the vehicle 20 will accelerate forward; and if the user 30 shifts their weight backward (by pushing their body, via the at least one control bar 56, relatively closer to the rear end 54 of the vehicle 20), the vehicle 20 will decelerate (and, in at least one embodiment, eventually accelerate backward should the user 30 desire). Additionally, in at least one embodiment, turning the vehicle 20 is accomplished by the user 30 shifting their weight laterally (i.e., leaning, via the at least one control bar 56) in the direction in which they wish to turn, in order to lean the vehicle 20 in that direction. Thus, in at least one embodiment, the vehicle 20 is controlled in a way similar to how a hang glider pilot controls a hang glider. This configuration has a significant effect on the experience of operating a self-balancing vehicle, as the experience is transformed from that of rolling along the ground (while in a seat or on a platform that is rigidly attached to the vehicle), as known prior art self-balancing vehicles function, to an experience that very closely simulates hang gliding flight and allows the rider to feel like they are flying just over the ground. As a result, for the first time, people who have been hesitant to hang glide due to a fear of heights (or other concerns) can experience a very close simulation of what it feels like to hang glide close to the ground. Many action sports enthusiasts who enjoy motorcycle riding, mountain biking, skateboarding, skiing, snowboarding, or other action sport pasttimes, will also be drawn to this new activity and potential sport. In that regard, in at least one embodiment, where the vehicle 20 is used in a sporting event, the vehicle 20 may provide an at least one number plate 60. It should be noted that the particular size, shape, configuration, position and quantity of the at least one control bar 56 depicted in the drawings is merely exemplary and is being shown for illustrative purposes only. As such, the at least one control bar 56 should not be read as being so limited, but instead may take on any other size, shape, configuration, position and quantity, now known or later developed, in further embodiments, so long as the vehicle 20 is capable of substantially carrying out the functionality described herein.

In at least one embodiment, the vehicle 20 also provides an at least one launch handle 62 secured to either the chassis 22 or the suspension frame 36 (or elsewhere on the vehicle 20), the at least one launch handle 62 positioned and configured for allowing the user 30 to optionally grasp the at least one launch handle 62 while initiating forward movement of the vehicle 20, prior to being properly suspended within the harness assembly 38, as depicted in FIGS. 6A-6C and discussed further below. It should be noted that the particular size, shape, configuration, position and quantity of the at least one launch handle 62 depicted in the drawings is merely exemplary and is being shown for illustrative purposes only. As such, the at least one launch handle 62 should not be read as being so limited, but instead may take on any other size, shape, configuration, position and quantity, now known or later developed, in further embodiments, so long as the vehicle 20 is capable of substantially carrying out the functionality described herein.

Figure 3:
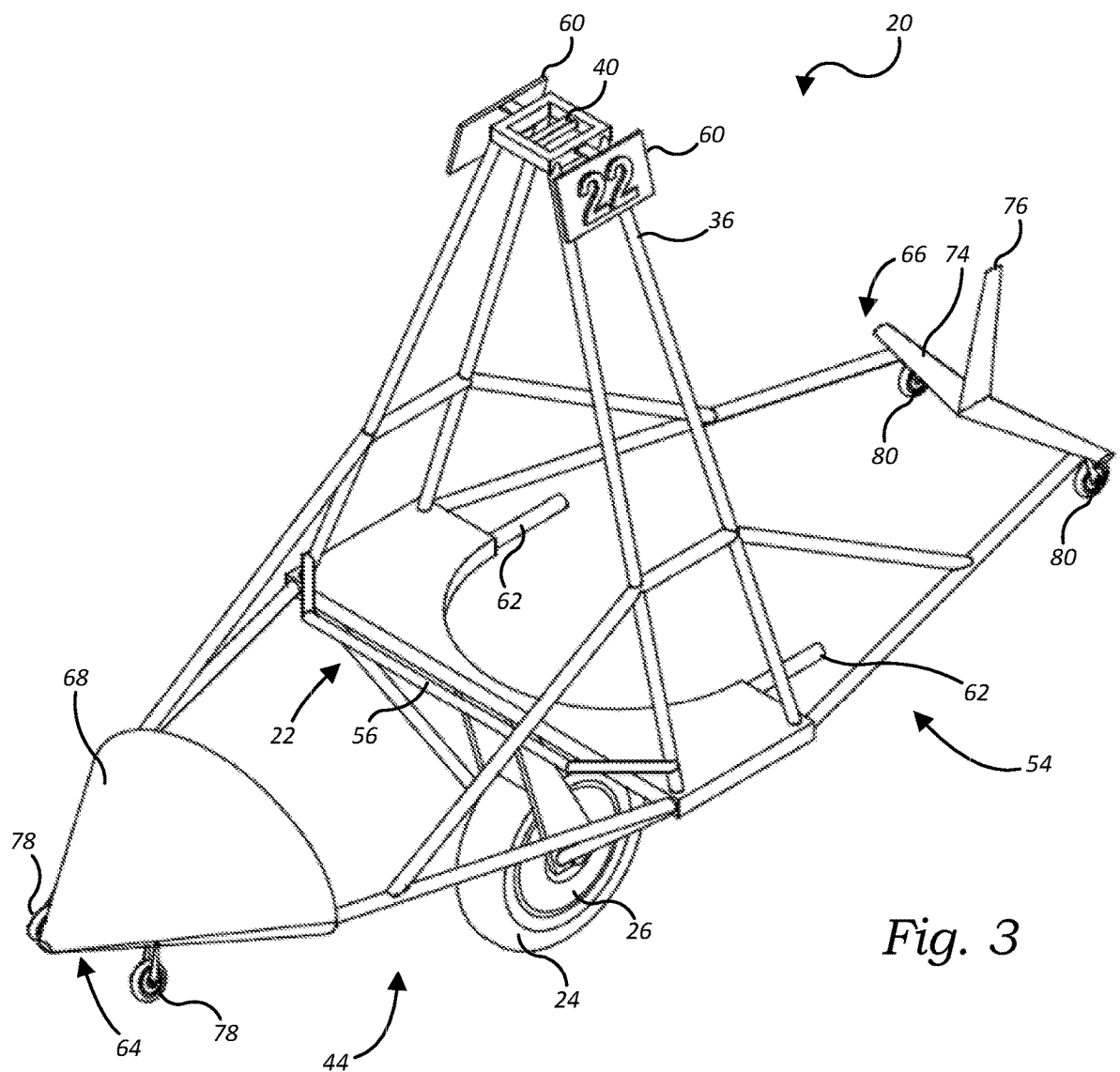
FIGS. 3 and 4 are perspective views of a further exemplary self-balancing personal vehicle, in accordance with at least one embodiment.
Figure 4:
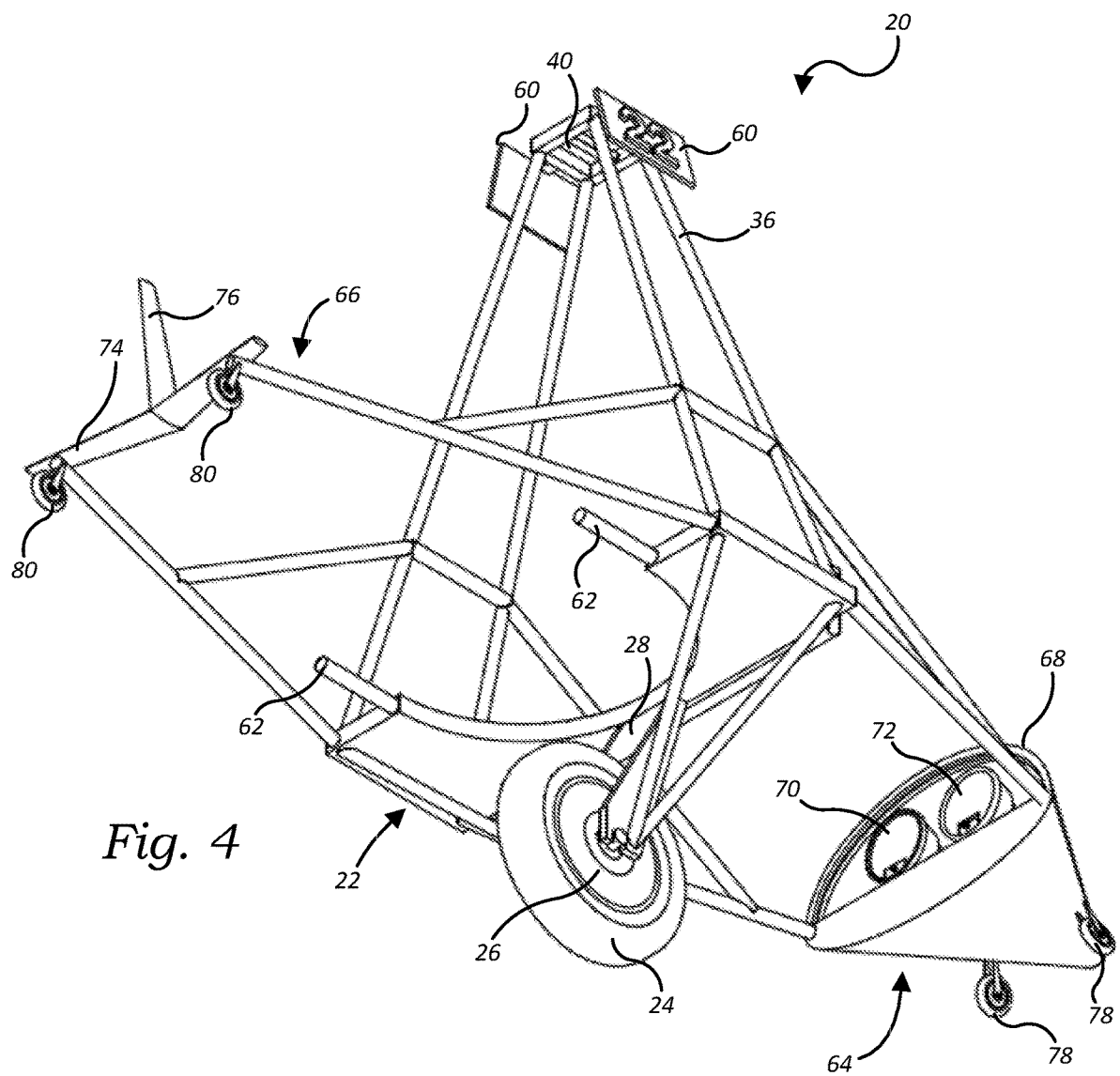

In at least one embodiment, as best illustrated in FIGS. 3 and 4, the chassis 22 includes a nose assembly 64 and an opposing tail assembly 66. In at least one such embodiment, the nose assembly 64 provides a nose cone 68 sized and configured for improving the aerodynamics of the vehicle 20. Additionally, in at least one embodiment, the nose cone 68 houses a dashboard that includes at least one of a speedometer 70, a bank angle indicator and a battery charge indicator 72. In at least one embodiment, the tail assembly 66 provides an at least one horizontal tail fin 74, and an at least one vertical tail fin 76 sized and configured for further improving the aerodynamics and stability of the vehicle 20.

In at least one embodiment, the nose assembly 64 provides an at least one front safety wheel 78 positioned and configured for being in selective rolling contact with the ground or a similar surface when the vehicle 20 is not in use, or in the event the vehicle 20 tilts too far forward during use. Similarly, in at least one embodiment, the tail assembly 66 provides an at least one rear safety wheel 80 positioned and configured for being in selective rolling contact with the ground or a similar surface when the vehicle 20 is not in use, or in the event the vehicle 20 tilts too far backward during use. Accordingly, in at least one such embodiment, less advanced users 30 are able to initiate forward movement of the vehicle 20 by first accelerating the vehicle 20 with the at least one primary wheel 24, along with either the at least one front safety wheel 78 or rear safety wheel 80, in rolling contact with the ground in order to gain a sufficient amount of speed before transitioning to the normal riding position depicted in FIG. 6C. Relatively more advanced users may not require the at least one front safety wheel 78 or rear safety wheel 80 to initially be in rolling contact with the ground. In at least one further embodiment (not shown), the chassis 22 may further include an at least one pair of lateral safety wheels positioned and configured for being in selective rolling contact with the ground or a similar surface when the vehicle 20 is not in use, or in the event the vehicle 20 tilts too far laterally during use. In at least one embodiment, the at least one front safety wheel 78, rear safety wheel 80, and lateral safety wheels are removably engaged, thereby allowing the user to selectively remove some or all of them after they are no longer necessary. It should be noted that the particular size, shape and configuration of each of the nose assembly 64 and tail assembly 66 depicted in the drawings is merely exemplary and is being shown for illustrative purposes only. As such, the nose assembly 64 and tail assembly 66 should not be read as being so limited, but instead may each take on any other size, shape or configuration, now known or later developed, in further embodiments, so long as the vehicle 20 is capable of substantially carrying out the functionality described herein.

Figure 5:
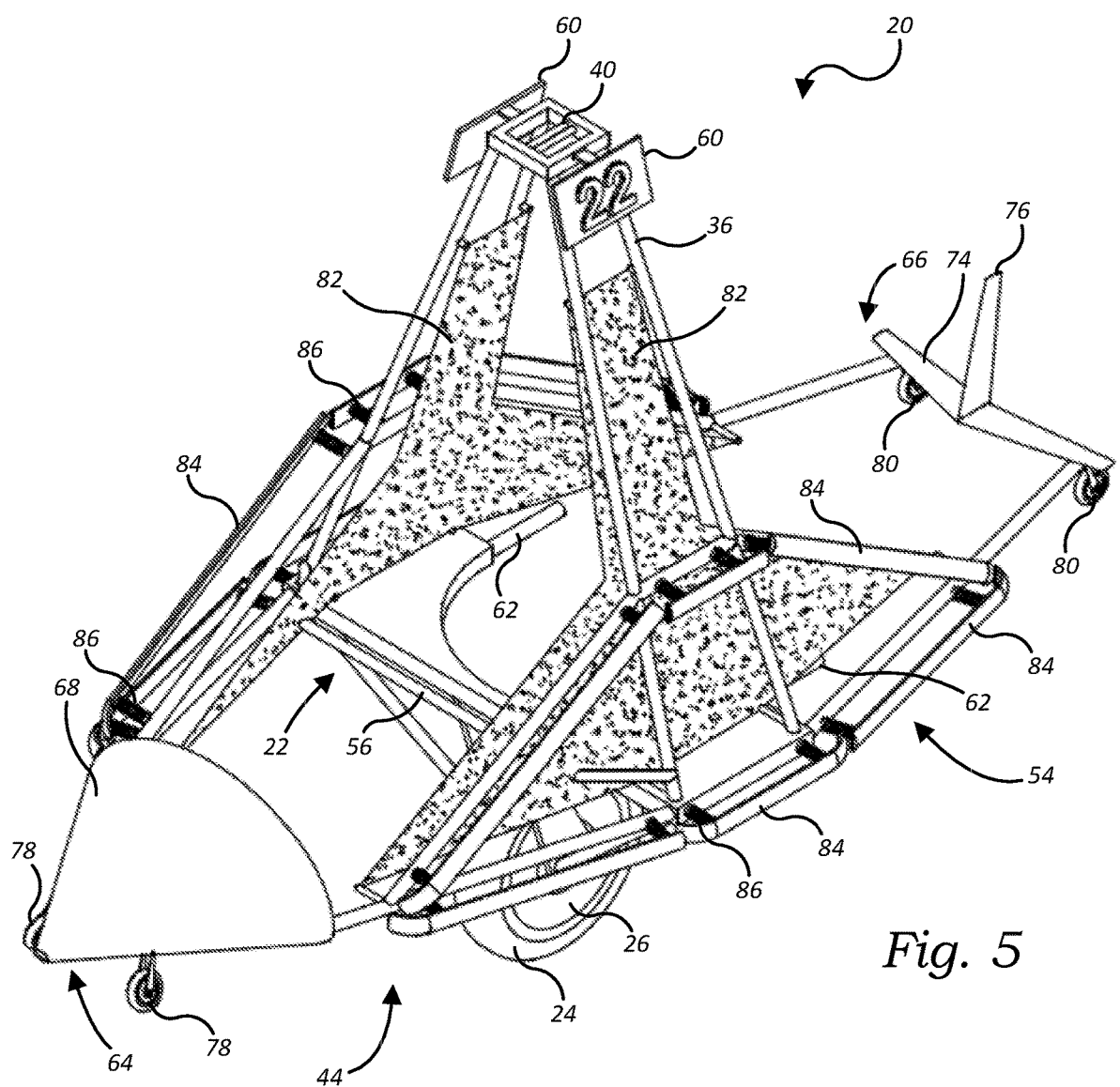
FIG. 5 is a perspective view of a still further exemplary self-balancing personal vehicle, in accordance with at least one embodiment.

In at least one embodiment, as best illustrated in FIG. 5, the vehicle 20 also provides lateral safety panels 82 spanning at least a portion of the chassis 22 (including the nose assembly 64 and tail assembly 66 where applicable) and the suspension frame 36, the safety panels 82 positioned and configured for providing additional protection to the user 30 during use of the vehicle 20. In at least one embodiment, the safety panels 82 are removably engagable with the vehicle 20; however, in at least one alternate embodiment, the safety panels 82 are permanently secured to the vehicle 20. In at least one embodiment, the safety panels 82 are constructed out of a resilient fabric or netting material. However, in further embodiments, the safety panels 82 may be constructed out of any material (or combination of materials), now known or later developed—such as plastic or metal, for example. It should also be noted that the particular size, shape, configuration, position and quantity of the safety panels 82 depicted in the drawings is merely exemplary and is being shown for illustrative purposes only. As such, the safety panels 82 should not be read as being so limited, but instead may take on any other size, shape, configuration, position and quantity, now known or later developed, in further embodiments, so long as the vehicle 20 is capable of substantially carrying out the functionality described herein.

With continued reference to FIG. 5, in at least one embodiment, the vehicle 20 also provides lateral skid guards 84 spanning at least a portion of the chassis 22 (including the nose assembly 64 and tail assembly 66 where applicable) and the suspension frame 36, the skid guards 84 positioned and configured for providing additional protection to the user 30 during use of the vehicle 20. In at least one embodiment, the skid guards 84 are removably engagable with the vehicle 20; however, in at least one alternate embodiment, the skid guards 84 are permanently secured to the vehicle 20. In at least one embodiment, the skid guards 84 are spaced apart from the chassis 22 and suspension frame 36 via springs 86, which allows the skid guards 84 to further function as shock absorbers in the event of sustaining an impact during use of the vehicle 20. In at least one embodiment, the skid guards 84 are enclosed by slightly recessed, removable fairing panels (not shown) that integrate with similar fairings (not shown) attached to at least one of the nose assembly 64, tail assembly 66 and suspension frame 36, and serve to improve and streamline the aesthetic appearance of the vehicle 20 while also improving its aerodynamics. It should also be noted that the particular size, shape, configuration, position and quantity of the skid guards 84 depicted in the drawings is merely exemplary and is being shown for illustrative purposes only. As such, the skid guards 84 should not be read as being so limited, but instead may take on any other size, shape, configuration, position and quantity, now known or later developed, in further embodiments, so long as the vehicle 20 is capable of substantially carrying out the functionality described herein.

Figure 8:
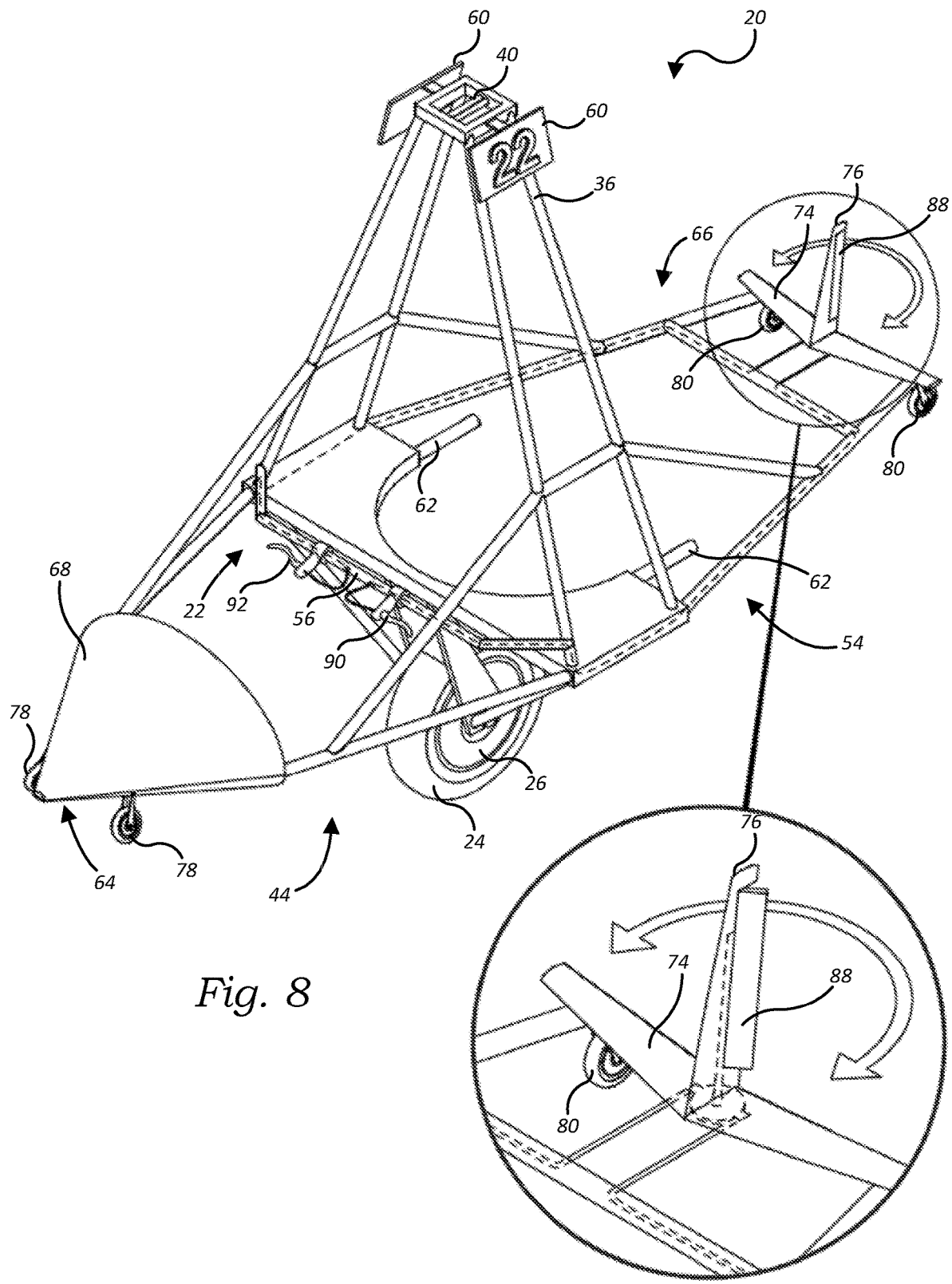
FIG. 8 is a perspective view of a still further exemplary self-balancing personal vehicle, in accordance with at least one embodiment.

In at least one embodiment, as best illustrated in FIG. 8, the vehicle 20 also provides an at least one rear rudder 88 positioned on the at least one vertical tail fin 76 of the tail assembly 66 and configured for allowing the user 30 to selectively adjust a yaw of the vehicle 20, which provides enhanced maneuverability when making sharp turns. In at least one such embodiment, a pair of left and right control levers 90 and 92 are configured for actuating the at least one rear rudder 88. The left and right control levers 90 and 92 are positioned on the chassis 22 and configured for allowing the user 30 to optionally grasp them during use of the vehicle 20. It should be noted that the particular size, shape, configuration, and position of the left and right control levers 90 and 92 depicted in the drawings is merely exemplary and is being shown for illustrative purposes only. As such, the left and right control levers 90 and 92 should not be read as being so limited, but instead may take on any other size, shape, configuration and position, now known or later developed, in further embodiments, so long as the vehicle 20 is capable of substantially carrying out the functionality described herein. In still further embodiments, any other mechanism or technology (or combinations thereof), now known or later developed, capable of actuating the at least one rear rudder 88, may be substituted.

Aspects of the present specification may also be described as follows:

1. A self-balancing personal vehicle comprising: a chassis having an at least one primary wheel positioned and configured for being in rolling contact with the ground or a similar surface; an at least one drive motor positioned and configured for selectively driving the at least one primary wheel; an at least one self-balancing system configured for automatically assisting the vehicle in maintaining a substantially upright position during use; a suspension frame secured to the chassis; an at least one harness assembly engaged with the suspension frame, the harness assembly sized and configured for removably receiving and suspending an at least one user a distance above the chassis; and an at least one control bar positioned and configured for allowing the user to grasp said control bar with at least one hand while suspended within the at least one harness assembly; whereby, while the user is suspended within the at least one harness assembly during use of the vehicle, the user is able to control the vehicle by selectively repositioning their body and shifting their weight, relative to the at least one primary wheel, via the at least one control bar.

2. The self-balancing personal vehicle according to embodiment 1, wherein the at least one drive motor is an electric drive motor.

3. The self-balancing personal vehicle according to embodiments 1-2, wherein the at least one drive motor is a hub motor positioned within the at least one primary wheel.

4. The self-balancing personal vehicle according to embodiments 1-3, further comprising an at least one battery in electrical communication with the at least one drive motor and self-balancing system.

5. The self-balancing personal vehicle according to embodiments 1-4, wherein the at least one self-balancing system includes at least one of a gyroscopic sensor and an accelerometer-based leveling sensor positioned and configured for detecting changes in a pitch angle of the vehicle and, in turn, causing the at least one primary wheel to automatically rotate forward or backward as needed in order to return the vehicle to a substantially upright pitch.

6. The self-balancing personal vehicle according to embodiments 1-5, wherein the chassis provides an at least one body panel sized and configured for enclosing and protecting the self-balancing system.

7. The self-balancing personal vehicle according to embodiments 1-6, wherein the suspension frame is configured for allowing the harness assembly to position a center of mass of the user substantially over the at least one primary wheel.

8. The self-balancing personal vehicle according to embodiments 1-7, wherein the suspension frame provides an at least one attachment point configured for engagement with the at least one harness assembly.

9. The self-balancing personal vehicle according to embodiments 1-8, wherein the at least one attachment point is an elongate beam, tube or similar structure.

10. The self-balancing personal vehicle according to embodiments 1-9, wherein the at least one attachment point is a ball joint configured for allowing the at least one harness assembly freedom of movement in virtually any direction about the attachment point.

11. The self-balancing personal vehicle according to embodiments 1-10, wherein the at least one harness assembly is configured for removably receiving and supporting the at least one user in a substantially prone position, with a head of the user positioned proximal a front end of the vehicle.

12. The self-balancing personal vehicle according to embodiments 1-11, wherein the at least one harness assembly provides an apron harness sized and configured for receiving and supporting a torso of the user.

13. The self-balancing personal vehicle according to embodiments 1-12, wherein the at least one harness assembly further provides a pair of leg supports configured for receiving and supporting the legs of the user.

14. The self-balancing personal vehicle according to embodiments 1-13, wherein the at least one harness assembly is configured for removably receiving and supporting the at least one user in a substantially supine position, with a head of the user positioned proximal a rear end of the vehicle.

15. The self-balancing personal vehicle according to embodiments 1-14, wherein the at least one harness assembly is configured for removably receiving and supporting the at least one user in a substantially seated or upright position.

16. The self-balancing personal vehicle according to embodiments 1-15, further comprising an at least one launch handle positioned and configured for allowing the user to optionally grasp said launch handle while initiating forward movement of the vehicle, prior to being properly suspended within the harness assembly.

17. The self-balancing personal vehicle according to embodiments 1-16, wherein the chassis provides a nose assembly and an opposing tail assembly.

18. The self-balancing personal vehicle according to embodiments 1-17, wherein the nose assembly provides a nose cone sized and configured for improving the aerodynamics of the vehicle.

19. The self-balancing personal vehicle according to embodiments 1-18, wherein the nose cone provides at least one of a speedometer, a bank angle indicator and a battery charge indicator.

20. The self-balancing personal vehicle according to embodiments 1-19, wherein the tail assembly provides at least one of an at least one horizontal tail fin and an at least one vertical tail fin sized and configured for further improving the stability and aerodynamics of the vehicle.

21. The self-balancing personal vehicle according to embodiments 1-20, wherein the at least one vertical tail fin provides an at least one rear rudder positioned and configured for allowing the user to selectively adjust a yaw of the vehicle.

22. The self-balancing personal vehicle according to embodiments 1-21, further comprising a pair of left and right manual control levers positioned and configured for selectively actuating the at least one rear rudder.

23. The self-balancing personal vehicle according to embodiments 1-22, wherein the nose assembly provides an at least one front safety wheel positioned and configured for being in selective rolling contact with the ground when the vehicle is not in use, for rolling starts, or in the event the vehicle tilts too far forward during use.

24. The self-balancing personal vehicle according to embodiments 1-23, wherein the tail assembly provides an at least one rear safety wheel positioned and configured for being in selective rolling contact with the ground when the vehicle is not in use, for rolling starts, or in the event the vehicle tilts too far backward during use.

25. The self-balancing personal vehicle according to embodiments 1-24, wherein the chassis provides an at least one pair of lateral safety wheels positioned and configured for being in selective rolling contact with the ground when the vehicle is not in use, or in the event the vehicle tilts too far laterally during use.

26. The self-balancing personal vehicle according to embodiments 1-25, further comprising an at least one lateral safety panel spanning at least a portion of at least one of the chassis and the suspension frame, the at least one safety panel positioned and configured for providing additional protection to the user during use of the vehicle.

27. The self-balancing personal vehicle according to embodiments 1-26, further comprising an at least one lateral skid guard spanning at least a portion of at least one of the chassis and the suspension frame, the at least one skid guard positioned and configured for providing additional protection to the user during use of the vehicle.

28. The self-balancing personal vehicle according to embodiments 1-27, wherein the at least one skid guard is spaced apart from at least one of the chassis and the suspension frame via a plurality of springs.

29. A self-balancing personal vehicle comprising: a chassis having an at least one primary wheel positioned and configured for being in rolling contact with the ground or a similar surface; an at least one drive motor positioned and configured for selectively driving the at least one primary wheel; an at least one self-balancing system configured for automatically assisting the vehicle in maintaining a substantially upright position during use; a suspension frame secured to the chassis; an at least one harness assembly engaged with the suspension frame, the harness assembly sized and configured for removably receiving and suspending an at least one user a distance above the chassis; an at least one control bar positioned and configured for allowing the user to grasp said control bar with at least one hand while suspended within the at least one harness assembly; the chassis providing a nose assembly and an opposing tail assembly; the nose assembly providing an at least one front safety wheel positioned and configured for being in selective rolling contact with the ground; and the tail assembly providing an at least one rear safety wheel positioned and configured for being in selective rolling contact with the ground; whereby, while the user is suspended within the at least one harness assembly during use of the vehicle, the user is able to control the vehicle by selectively repositioning their body and shifting their weight, relative to the at least one primary wheel, via the at least one control bar.

30. A self-balancing personal vehicle comprising: a chassis having an at least one primary wheel positioned and configured for being in rolling contact with the ground or a similar surface; an at least one drive motor positioned and configured for selectively driving the at least one primary wheel; an at least one self-balancing system configured for automatically assisting the vehicle in maintaining a substantially upright position during use; a suspension frame secured to the chassis; an at least one harness assembly engaged with the suspension frame, the harness assembly sized and configured for removably receiving and suspending an at least one user a distance above the chassis; an at least one control bar positioned and configured for allowing the user to grasp said control bar with at least one hand while suspended within the at least one harness assembly; the chassis providing a nose assembly and an opposing tail assembly; and the tail assembly providing an at least one horizontal tail fin and an at least one vertical tail fin, said vertical tail fin providing an at least one rear rudder positioned and configured for allowing the user to selectively adjust a yaw of the vehicle; whereby, while the user is suspended within the at least one harness assembly during use of the vehicle, the user is able to control the vehicle by selectively repositioning their body and shifting their weight, relative to the at least one primary wheel, via the at least one control bar.

In closing, regarding the exemplary embodiments of the present invention as shown and described herein, it will be appreciated that a self-balancing personal vehicle is disclosed having a suspended harness assembly configured for allowing a user to be suspended therewithin and operate the vehicle through selectively shifting the user's weight. Because the principles of the invention may be practiced in a number of configurations beyond those shown and described, it is to be understood that the invention is not in any way limited by the exemplary embodiments, but is generally directed to a self-balancing personal vehicle with a suspended harness assembly and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A self-balancing personal vehicle comprising:
a chassis having an at least one primary wheel positioned and configured for being in rolling contact with the ground or a similar surface;
an at least one drive motor positioned and configured for selectively driving the at least one primary wheel;
an at least one self-balancing system configured for automatically assisting the vehicle in maintaining a substantially upright position during use;
a suspension frame secured to the chassis;
an at least one harness assembly engaged with the suspension frame, the harness assembly sized and configured for removably receiving and suspending an at least one user a distance above the chassis; and
an at least one control bar positioned and configured for allowing the user to grasp said control bar with at least one hand while suspended within the at least one harness assembly;
whereby, while the user is suspended within the at least one harness assembly during use of the vehicle, the user is able to control the vehicle by selectively repositioning their body and shifting their weight, relative to the at least one primary wheel, via the at least one control bar.

2. The self-balancing personal vehicle of claim 1, wherein the at least one drive motor is a hub motor positioned within the at least one primary wheel.

3. The self-balancing personal vehicle of claim 1, wherein the at least one harness assembly is configured for removably receiving and supporting the at least one user in a substantially prone position, with a head of the user positioned proximal a front end of the vehicle.

4. The self-balancing personal vehicle of claim 1, wherein the at least one harness assembly is configured for removably receiving and supporting the at least one user in a substantially supine position, with a head of the user positioned proximal a rear end of the vehicle.

5. The self-balancing personal vehicle of claim 1, wherein the at least one harness assembly is configured for removably receiving and supporting the at least one user in a substantially seated or upright position.

6. The self-balancing personal vehicle of claim 1, further comprising an at least one launch handle positioned and configured for allowing the user to optionally grasp said launch handle while initiating forward movement of the vehicle, prior to being properly suspended within the harness assembly.

7. The self-balancing personal vehicle of claim 1, wherein the chassis provides a nose assembly and an opposing tail assembly.

8. The self-balancing personal vehicle of claim 7, wherein the nose assembly provides a nose cone sized and configured for improving the aerodynamics of the vehicle.

9. The self-balancing personal vehicle of claim 8, wherein the nose cone provides at least one of a speedometer, a bank angle indicator and a battery charge indicator.

10. The self-balancing personal vehicle of claim 7, wherein the tail assembly provides at least one of an at least one horizontal tail fin and an at least one vertical tail fin sized and configured for further improving the stability and aerodynamics of the vehicle.

11. The self-balancing personal vehicle of claim 10, wherein the at least one vertical tail fin provides an at least one rear rudder positioned and configured for allowing the user to selectively adjust a yaw of the vehicle.

12. The self-balancing personal vehicle of claim 11, further comprising a pair of left and right manual control levers positioned and configured for selectively actuating the at least one rear rudder.

13. The self-balancing personal vehicle of claim 7, wherein the nose assembly provides an at least one front safety wheel positioned and configured for being in selective rolling contact with the ground.

14. The self-balancing personal vehicle of claim 7, wherein the tail assembly provides an at least one rear safety wheel positioned and configured for being in selective rolling contact with the ground.

15. The self-balancing personal vehicle of claim 7, wherein the chassis provides an at least one pair of lateral safety wheels positioned and configured for being in selective rolling contact with the ground.

16. The self-balancing personal vehicle of claim 7, further comprising an at least one lateral safety panel spanning at least a portion of at least one of the chassis and the suspension frame, the at least one safety panel positioned and configured for providing additional protection to the user during use of the vehicle.

17. The self-balancing personal vehicle of claim 7, further comprising an at least one lateral skid guard spanning at least a portion of at least one of the chassis and the suspension frame, the at least one skid guard positioned and configured for providing additional protection to the user during use of the vehicle.

18. The self-balancing personal vehicle of claim 17, wherein the at least one skid guard is spaced apart from at least one of the chassis and the suspension frame via a plurality of springs.

19. A self-balancing personal vehicle comprising:
a chassis having an at least one primary wheel positioned and configured for being in rolling contact with the ground or a similar surface;
an at least one drive motor positioned and configured for selectively driving the at least one primary wheel;
an at least one self-balancing system configured for automatically assisting the vehicle in maintaining a substantially upright position during use;
a suspension frame secured to the chassis;
an at least one harness assembly engaged with the suspension frame, the harness assembly sized and configured for removably receiving and suspending an at least one user a distance above the chassis;
an at least one control bar positioned and configured for allowing the user to grasp said control bar with at least one hand while suspended within the at least one harness assembly;
the chassis providing a nose assembly and an opposing tail assembly;
the nose assembly providing an at least one front safety wheel positioned and configured for being in selective rolling contact with the ground; and
the tail assembly providing an at least one rear safety wheel positioned and configured for being in selective rolling contact with the ground;
whereby, while the user is suspended within the at least one harness assembly during use of the vehicle, the user is able to control the vehicle by selectively repositioning their body and shifting their weight, relative to the at least one primary wheel, via the at least one control bar.

20. A self-balancing personal vehicle comprising:
a chassis having an at least one primary wheel positioned and configured for being in rolling contact with the ground or a similar surface;
an at least one drive motor positioned and configured for selectively driving the at least one primary wheel;
an at least one self-balancing system configured for automatically assisting the vehicle in maintaining a substantially upright position during use;
a suspension frame secured to the chassis;
an at least one harness assembly engaged with the suspension frame, the harness assembly sized and configured for removably receiving and suspending an at least one user a distance above the chassis;
an at least one control bar positioned and configured for allowing the user to grasp said control bar with at least one hand while suspended within the at least one harness assembly;
the chassis providing a nose assembly and an opposing tail assembly; and
the tail assembly providing an at least one horizontal tail fin and an at least one vertical tail fin, said vertical tail fin providing an at least one rear rudder positioned and configured for allowing the user to selectively adjust a yaw of the vehicle;
whereby, while the user is suspended within the at least one harness assembly during use of the vehicle, the user is able to control the vehicle by selectively repositioning their body and shifting their weight, relative to the at least one primary wheel, via the at least one control bar.

* * * * *